United States Patent
Cai et al.

(10) Patent No.: US 9,082,040 B2
(45) Date of Patent: Jul. 14, 2015

(54) IDENTIFYING VISUAL CONTEXTUAL SYNONYMS

(75) Inventors: Rui Cai, Beijing (CN); Zhiwei Li, Beijing (CN); Lei Zhang, Beijing (CN); Wenbin Tang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 13/107,717

(22) Filed: May 13, 2011

(65) Prior Publication Data

US 2012/0290577 A1    Nov. 15, 2012

(51) Int. Cl.
*G06F 17/30*    (2006.01)
*G06K 9/46*    (2006.01)

(52) U.S. Cl.
CPC ........ *G06K 9/4671* (2013.01); *G06F 17/30256* (2013.01); *G06K 9/4676* (2013.01)

(58) Field of Classification Search
None
See application file for complete search history.

(56) References Cited

U.S. PATENT DOCUMENTS

| | | | |
|---|---|---|---|
| 5,983,237 A * | 11/1999 | Jain et al. ........................... | 1/1 |
| 7,603,349 B1 | 10/2009 | Kraft et al. | |
| 8,031,940 B2 * | 10/2011 | Vincent et al. ............... | 382/176 |
| 2007/0214172 A1 * | 9/2007 | Nister et al. ................... | 707/102 |
| 2008/0317358 A1 | 12/2008 | Bressan et al. | |
| 2009/0074306 A1 * | 3/2009 | Liu et al. ....................... | 382/229 |
| 2009/0112800 A1 | 4/2009 | Athsani | |
| 2010/0088295 A1 * | 4/2010 | Duan et al. ..................... | 707/705 |
| 2010/0135582 A1 * | 6/2010 | Gokturk et al. ............... | 382/195 |
| 2010/0189354 A1 * | 7/2010 | de Campos et al. .......... | 382/190 |
| 2010/0191743 A1 | 7/2010 | Perronnin et al. | |
| 2010/0257202 A1 | 10/2010 | Szummer et al. | |

OTHER PUBLICATIONS

Cao, et al., Spatial-Bag-of-Features, IEEE 2010, pp. 3352-3359.
Chum, et al., Total Recall: Automatic Query Expansion with a Generative Feature Model for Object Retrieval, IEEE 2007, 8 pages.
Datar, et al., Locality-Sensitive Hashing Scheme Based on p-Stable Distributions, SCG 2004, Jun. 9-11, 2004, Brooklyn, NY, 2004, pp. 253-262.
Frost, et al., Strategies for Visual Word Recognition and Orthographical Depth: A Multilingual Comparison, Journal of Experimental Psychology: Human Perception and Performance 1987, vol. 13, No. 1, 104-115.
Grainger, et al., Orthographic Processing in Visual Word Recognition: A Multiple Read-Out Model, <<http://cogprints.org/654/1/MROM.html>>, accessed on Jan. 4, 2011.

(Continued)

*Primary Examiner* — Rehana Perveen
*Assistant Examiner* — Raheem Hoffler
(74) *Attorney, Agent, or Firm* — Sandy Swain; Judy Yee; Micky Minhas

(57) ABSTRACT

Tools and techniques for identifying visual contextual synonyms are described herein. The described operations use visual words having similar contextual distributions as contextual synonyms to identify and describe visual objects that share semantic meaning. The contextual distribution of a visual word is described using the statistics of co-occurrence and spatial information averaged over image patches that share the visual word. In various implementations, the techniques are employed to construct a visual contextual synonym dictionary for a large visual vocabulary. In various implementations, the visual contextual synonym dictionary narrows the semantic gap for large-scale visual search.

20 Claims, 9 Drawing Sheets

(56) References Cited

OTHER PUBLICATIONS

Jacobs, et al., Models of Visual Word Recognition: Sampling the State of the Art, Journal of Experimental Psychology: Human Perception and Performance 20 (6) 1311-1334.

Jegou, et al., A contextual dissimilarity measure for accurate and efficient image search, IEEE 2007, 8 pages.

Jegou, et al., Improving bag-of-features for large scale image search, Jul. 27, 2009, 21 pages.

Lazebnik, et al., Beyond Bags of Features: Spatial Pyramid Matching for Recognizing Natural Scene Categories, Proceedings of the 2006 IEEE Computer Society Conference on Computer Vision and Pattern Recognition (CVPR 2006), 8 pages.

Lowe, Distinctive Image Features from Scale-Invariant Keypoints, International Journal of Computer Vision, 2004, 28 pages.

Mikulik, Learning a Fine Vocabulary, ECCV-10 submission ID 1092, retrieved from <<http://cmp.felk.cvut.cz/~chum/papers/mikulik_eccv10.pdf>> on Jan. 4, 2011.

Nister, et al., Scalable Recognition with a Vocabulary Tree, Proceedings of the 2006 IEEE Computer Society Conference on Computer Vision and Pattern Recognition (CVPR 2006), 8 pages.

Philbin, et al., Descriptor Learning for Efficient Retrieval, retrieved from <<http://www.robots.ox.ac.uk/~vgg/publications/papers/philbin10b.pdf>>, accessed on Jan. 4, 2011.

Philbin, et al., Lost in Quantization: Improving Particular Object Retrieval in Large Scale Image Databases, IEEE 2008, 8 pages.

Philbin, Object retrieval with large vocabularies and fast spatial matching, IEEE 2007, 8 pages.

Sivic, et al., Video Google: A Text Retrieval Approach to Object Matching in Videos, Proceedings of the Ninth IEEE International Conference on Computer Vision (ICCV 2003), 8 pages.

Tuytelaars, et al., Local Invariant Feature Detectors: A Survey, Foundations and Trends in Computer Graphics and Vision, vol. 3, No. 3, 2007, pp. 177-280.

van de Sande, et al., Evaluating Color Descriptors for Object and Scene Recognition, IEEE Transactions on Pattern Analysis and Machine Intelligence, vol. 32, No. 9, Sep. 2010, pp. 1582-1596.

van Gemert, et al., Visual Word Ambiguity, Accepted in IEEE Transactions on Pattern Analysis and Machine Intelligence, Manuscript received Jun. 26, 2008, retrieved at <<http://www.science.uva.nl/research/publications/2010/vanGemertTPAMI2010/Gemert-TPAMI2010.pdf>>, accessed on Jan. 4, 2011.

Voorhees, Query Expansion using Lexical-Semantic Relations, retrieved from <<http://www.iro.umontreal.ca/~nie/IFT6255/voorhees-94.pdf>> on Jan. 4, 2011.

Winder, et al., Learning Local Image Descriptors, IEEE 2007, 8 pages.

Wu, et al., Bundling Features for Large Scale Partial-Duplicate Web Image Search, retrieved on <<www.research.microsoft.com/pubs/80803/CVPR_2009_bundle.pdf>> on Jan. 4, 2011.

Xu, et al., Improving the Effectiveness of Information Retrieval with Local Context Analysis, ACM Transactions on Information Systems, vol. 18, No. 1, Jan. 2000, pp. 79-112.

Yuan, et al., Discovery of Collocation Patterns: from Visual Words to Visual Phrases, IEEE 2007, 8 pages.

Zheng, et al., Visual Synset: Towards a Higher-level Visual Representation, IEEE 2008, 8 pages.

Zhang, Efficient Indexing for Large Scale Visual Search, 2009 IEEE 12th International Conference on Computer Vision, 8 pages.

Zhao, Narrowing the Semantic Gap—Improved Text-Based Web Document Retrieval Using Visual Features, IEEE Transactions on Multimedia, vol. 4, No. 2, Jun. 2002, 12 pages.

\* cited by examiner

IDENTIFYING VISUAL CONTEXTUAL SYNONYMS

BACKGROUND

Conventional visual search methods are based on a bag-of-features framework. Bag-of-features frameworks typically work by, first, extracting local region descriptors such as a Scale Invariant Feature Transform (SIFT) for each image from a database. Bag-of-features frameworks, next, typically quantize high-dimensional local descriptors into discrete visual words using a visual vocabulary. The most common method to construct a visual vocabulary is to perform clustering, e.g., K-means clustering, on the descriptors extracted from a set of training images, and to treat each cluster as a visual word described by an interest point at its center. The quantization step assigns a local descriptor to the visual word closest to the local descriptor in the vocabulary in terms of Euclidean ($l_2$) distance using approximate search algorithms like KD-tree and Locality Sensitive Hashing. Bag-of-features frameworks then, typically after quantization, represent each image by a frequency histogram of a bag of visual words. However, visual descriptor quantization causes two serious and unavoidable problems, mismatch and semantic gap.

Mismatch, which is due to one visual word being too coarse to distinguish descriptors extracted from semantically different objects, is termed a polysemy phenomenon. The polysemy phenomenon is particularly prominent when the visual vocabulary is small. By contrast, semantic gap means several different visual words describe visual objects that are semantically the same, which leads to a synonymy phenomenon. The synonymy phenomenon is especially prevalent when adopting a large visual vocabulary, and usually results in poor recall performance in visual search and computer vision applications such as object retrieval, object recognition, object categorization, etc. One of the reasons behind the synonymy phenomenon is a lack of robust local descriptor algorithms. Local descriptors like scale invariant feature transform (SIFT) are sensitive to small disturbances, e.g., changes in viewpoint, scale, blur, and capturing condition. Such disturbances cause SIFT to output unstable and noisy feature values.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

According to some implementations, techniques and tools to identify visual contextual synonyms employ visual contextual distributions to obviate semantic gap from visual words that are close in a local feature space not sharing semantic meaning. The described operations use visual words having similar contextual distributions as contextual synonyms to identify and describe visual objects that share semantic meaning. The techniques describe contextual distribution of a visual word using the statistics of co-occurrence and spatial information averaged over image patches that share the visual word.

Further, in some implementations, the tools construct a visual contextual synonym dictionary for a large visual vocabulary. In various implementations, the visual contextual synonym dictionary narrows semantic gap for large-scale visual search.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
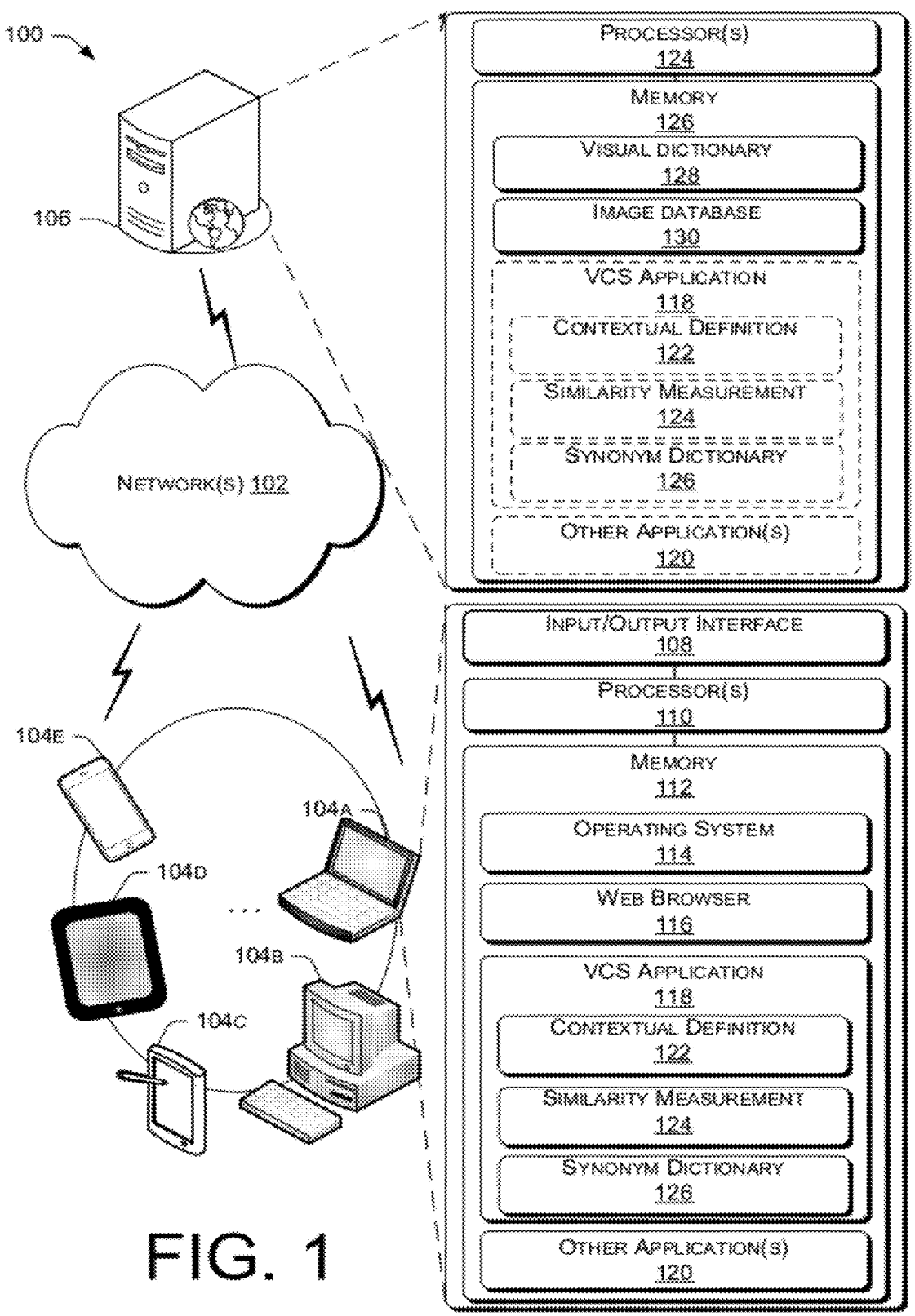
FIG. 1 illustrates an example architecture including a hardware and logical configuration of a computing device for identifying visual contextual synonyms according to some implementations.

This disclosure is directed to a framework using a dictionary of visual contextual synonyms to narrow the semantic gap in visual word quantization techniques by expanding a visual word in a query image with its synonyms to boost retrieval recall for visual search and computer vision applications such as object retrieval, object recognition, object categorization, etc. Instead of using Euclidean ($l_2$) distance-based nearest neighbors in the descriptor space, the described operations use visual words having similar contextual distributions (e.g., contextual synonyms) that are more likely to identify and describe visual objects that share semantic meaning. The statistics of co-occurrence and spatial information averaged over the image patches that share the visual word describe the contextual distribution of a visual word herein. In various implementations, the techniques construct a contextual synonym dictionary for a large visual vocabulary. Experimental results show that visual contextual synonym dictionary-based expansion consistently outperforms $l_2$ distance-based soft-quantization.

The techniques described herein provide an effective solution to narrow the semantic gap in visual search and computer vision applications such as object retrieval, object recognition, object categorization, etc. by identifying visual contextual synonyms from a visual vocabulary. A set of local points that are within a predefined spatial region of the visual word define a visual context of a visual word herein. Thus, visual words that represent the same semantic meaning have similar visual contextual distributions.

A visual phrase is a set of frequently co-occurring visual words, observed for visual objects from the same semantic category (e.g., buildings, cars, plants, people, etc.). Besides co-occurrence, visual contextual synonym techniques incorporate local spatial information in the visual contextual distribution with a corresponding contextual similarity measure to identify synonymous words rather than the context of an individual image patch. Visual contextual synonym techniques described herein employ statistics of contextual spatial information for a visual word averaged over all of the image patches assigned to that word. The visual contextual synonym techniques described herein define "contextual synonyms" of a visual word as its nearest neighbors in terms of a calculated contextual similarity measure. The ensemble of contextual synonyms of all acquired visual words make up a contextual synonym dictionary, which can be computed offline and stored in memory for efficient visual search and use in computer vision applications such as object retrieval, object recognition, object categorization, etc. According to several implementations for visual search, techniques for visual contextual synonyms assign a descriptor to a weighted combination of the visual words contextually most near each other using visual contextual synonym-based expansion.

The discussion below begins with a section entitled "Example Architecture," which describes one non-limiting environment that may implement the described techniques. Next, a section entitled "Example Applications" presents several examples of applications using visual contextual synonyms. A third section, entitled "Example Processes" presents several example processes for identifying visual contextual synonyms. A brief conclusion ends the discussion.

This brief introduction, including section titles and corresponding summaries, is provided for the reader's convenience and is not intended to limit the scope of the claims, nor the proceeding sections.

Example Architecture

FIG. 1 illustrates an example computing architecture 100 in which visual contextual synonyms techniques may be implemented. The architecture 100 includes a network 102 over which a client computing device 104 may be connected to a server 106. The architecture 100 may include a variety of computing devices 104, and in some implementations may operate as a peer-to-peer rather than a client-server type network.

As illustrated, computing device 104 includes an input/output interface 108 coupled to one or more processors 110 and memory 112, which can store an operating system 114 and one or more applications including a web browser application 116, a visual contextual synonym (VCS) application 118, and other applications 120 for execution by processors 110. In various implementations, VCS application 118 includes a contextual definition component 122, a similarity measurement component 124, and a synonym dictionary component 126, although in some instances, one or more of components 122, 124, and 126 may be implemented separately from VCS application 118.

In the illustrated example, server 106 includes one or more processors 128 and memory 130, which may store one or more visual dictionaries 132, and one or more image databases 134, and one or more other instances of programming. For example, in some implementations visual contextual synonym application 118 contextual definition component 122, similarity measurement component 124, synonym dictionary component 126, and/or other applications 120, are embodied in server 106. Similarly, in various implementations one or more visual dictionaries 132, one or more image databases 134 may be embodied in computing device 104.

While FIG. 1 illustrates computing device 104a as a laptop-style personal computer, other implementations may employ a desktop personal computer 104b, a personal digital assistant (PDA) 104c, a thin client 104d, a mobile telephone 104e, a portable music player, a game-type console (such as Microsoft Corporation's Xbox™ game console), a television with an integrated set-top box 104f or a separate set-top box, or any other sort of suitable computing device or architecture.

Memory 112, meanwhile, may include computer-readable storage media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device such as computing device 104 or server 106.

In contrast, communication media may embody computer readable instructions, data structures, program modules, or other data in a modulated data signal, such as a carrier wave, or other transmission mechanism. As defined herein, computer storage media does not include communication media.

Visual contextual synonym application 118 represents a desktop application or other application having logic processing on computing device 104. Other applications 120 may represent desktop applications, web applications provided over a network 102, and/or any other type of application capable of running on computing device 104. Network 102, meanwhile, is representative of any one or combination of multiple different types of networks, interconnected with each other and functioning as a single large network (e.g., the Internet or an intranet). Network 102 may include wire-based networks (e.g., cable) and wireless networks (e.g., Wi-Fi, cellular, satellite, etc.). In several implementations, visual contextual synonym application 118 operates on client device 104 from a web page.

Example Applications

Figure 2:
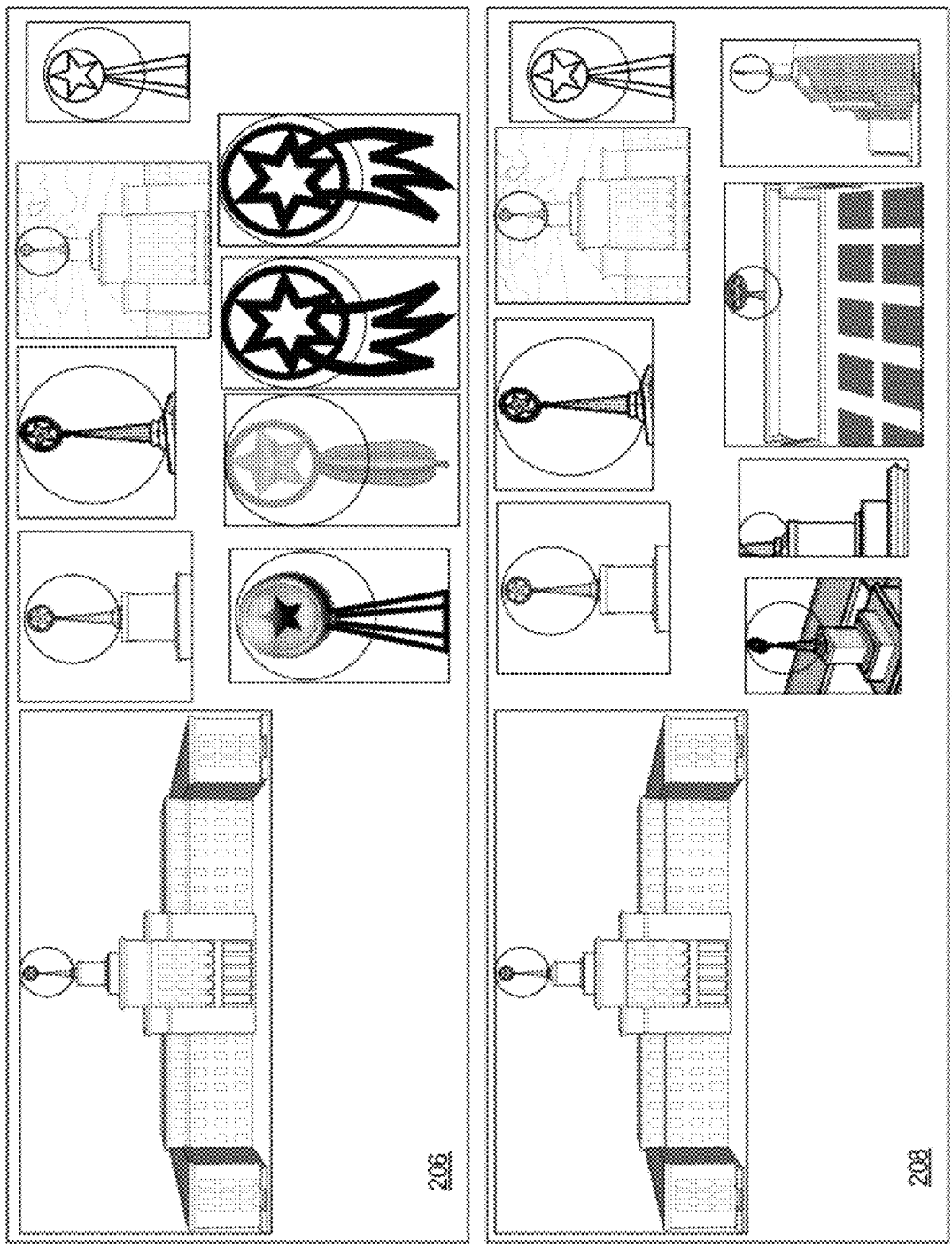
FIG. 2 illustrates, for a query image, an $l_2$ panel and a panel using visual contextual synonyms identified according to some implementations.

FIG. 2, at 200, illustrates, for a query image, an $l_2$ panel and a panel using visual contextual synonyms identified according to some implementations.

Query image 202 is annotated with a circle 204 encompassing the Harris scale. Top panel 206 illustrates the "semantic gap" between descriptors and semantic objects. Top panel 206 represents an example of a visual word containing nine patches that are the closest samples to the corresponding cluster center according to $l_2$ distance. The Harris scale of each patch in top panel 206 is also marked with a circle 204.

Bottom panel 208 also represents an example of a visual word containing nine patches. The nine patches of 208 represent the closest identified visual contextual synonyms. The Harris scale of each patch in bottom panel 208 is also marked with a circle 204. Bottom panel 208 is more semantically related to the query image 202, although some of the patches are further away from query image 202 in the descriptor space.

Top panel 206 represents mismatch due to the polysemy phenomenon. The polysemy phenomenon means one visual word is too coarse to distinguish descriptors extracted from semantically different objects, and is particularly prominent when the visual vocabulary is small. The nine patches that make up top panel 206 describe several objects of different categories with different semantic meanings (e.g., a building, award, fruit, shooting star), that have close $l_2$ distances to query image 202. Especially in a smaller visual vocabulary, patches such as those illustrated by panel 206 are likely to be grouped into one visual word and lead to poor precision in retrieval.

Bottom panel 208 illustrates an effective synonym expansion strategy for visual search. The nine patches of panel 208 are visual contextual synonyms identified from a visual vocabulary based on sharing similar contextual distributions. In VCS application 118, contextual definition component 122 defines visual context as a set of local points that are in a predefined spatial region of a visual word. Visual words having similar visual contextual distributions represent the same semantic meaning. Meanwhile, for example, a visual phrase represents a set of frequently co-occurring visual words. Visual phrases identify visual objects from the same semantic category (e.g., buildings, cars, plants, people, etc.). Besides co-occurrence, visual contextual synonym application 118 incorporates spatial information local to the visual contextual distribution with the corresponding contextual similarity measure.

The local spatial information of a visual word is an average of the contextual statistics from all of the image patches assigned to that word.

Herein "contextual synonyms" are defined as the nearest neighbors of a visual word in terms of the contextual similarity measure. The ensemble of visual contextual synonyms of a collection of the visual words, which in some instances may be substantially all visual words, is a visual contextual synonym dictionary. A visual contextual synonym dictionary can be computed offline and stored in memory for fast search access. For visual search, visual contextual synonym application 118 replaces $l_2$ distance-based expansion with contextual synonym-based expansion.

In visual contextual synonym application 118, a visual vocabulary $\Omega=\{\omega_1, \ldots, \omega_m, \ldots, \omega_M\}$ is defined in which $\omega_m$ is the $m^{th}$ visual word and $M=|\Omega|$ is the vocabulary size. Each extracted local descriptor is assigned to its nearest visual word (i.e., quantization). As a result, an image I is represented as a bag of visual words $\{\omega_{p_i}\}$ where $\omega_{p_i}$ is the visual word of the $i^{th}$ interest point $p_i$ on I. Correspondingly, $(x_{p_i}, y_{p_i})$ represents the coordinate of $p_i$, and $scale_{p_i}$ denotes its Harris scale output by a detector such as SIFT, Rank-SIFT, Color-SIFT, Harris-Laplace, Harris-Affine, etc. Moreover, for a visual word $\omega_m$, an instance set, $\Pi_m$, is defined as all of the interest points quantized to $\omega_m$ in the database such as image database 130.

Example Process

Figure 3:
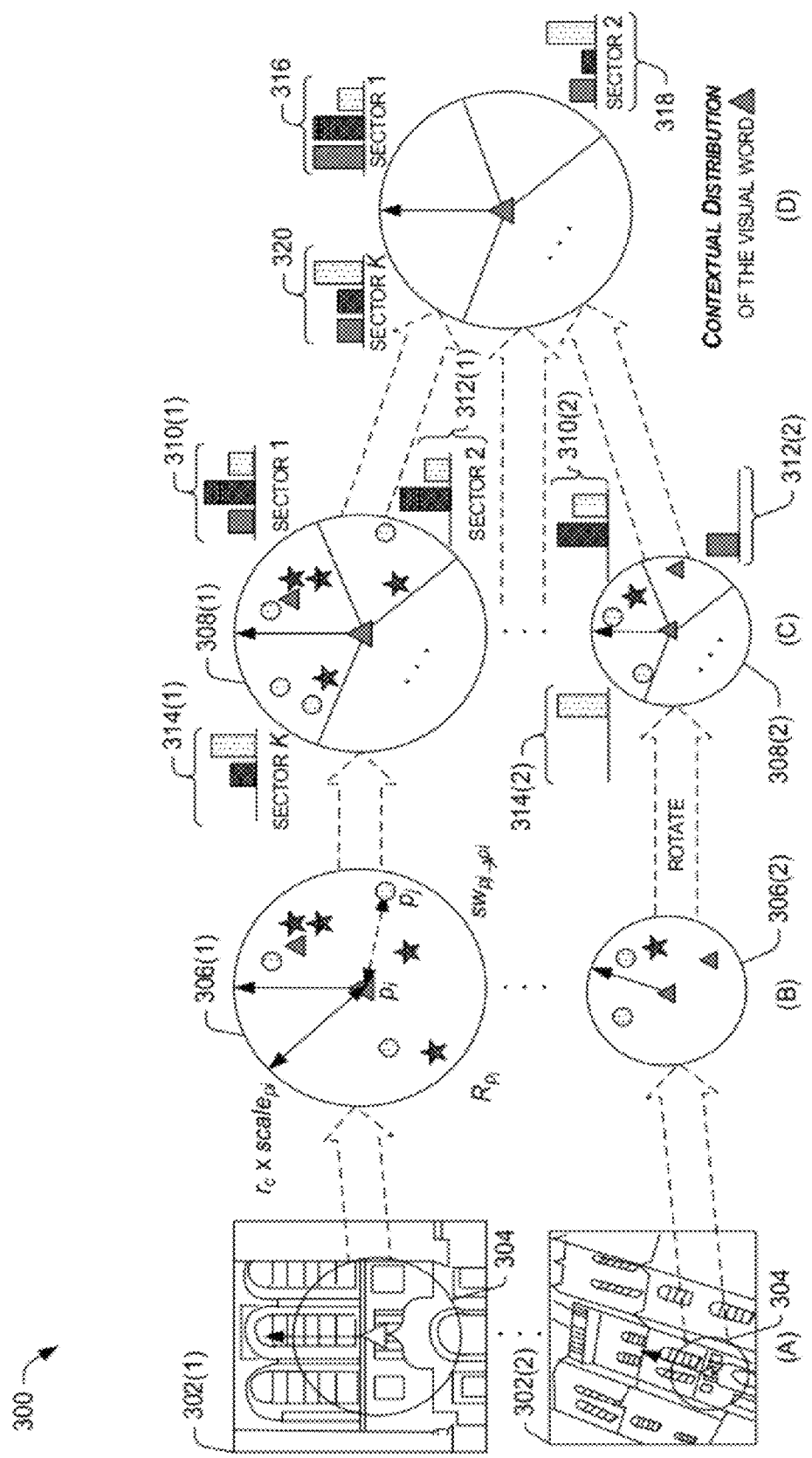
FIG. 3 illustrates a process to estimate the contextual distribution of a visual word according to some implementations.

FIG. 3, at 300, illustrates a process to estimate the contextual distribution of a visual word according to some implementations. In a textual document, the context of a word is its surrounding text, e.g., a sentence or a paragraph containing that word. For an interest point $p_i$, there are no such syntax boundaries. In several embodiments, contextual definition component 122 defines a visual context of an interest point $p_i$ as a spatial circular region $R_{p_i}$ that is centered at $p_i$.

As shown in FIG. 3(A), circle 304 denotes circular region $R_{p_i}$. Circle 304 annotates both image patches 302(1) and 302(2). Meanwhile, FIG. 3(B) illustrates features extracted from spatial circular region $R_{p_i}$ of images 302(1) and 302(2) at 306(1) and 306(2), respectively.

As illustrated in FIGS. 3(A) and (B), the radius of circular region $R_{p_i}$ is $r_c \times scale_{p_i}$, where $r_c$ is a multiplier to control the contextual region size. Since the radius is in proportion to the Harris scale, denoted $scale_{p_i}$, the circular region $R_{p_i}$ is robust to object scaling.

For illustration, triangles, circles, and stars represent various interest points in 306(1) and 306(2), with $p_i$ representing the central interest point for both 306(1) and 306(2).

Contextual definition component 122 calculates supporting weight to distinguish the contributions of two different local points to the contextual distribution of $p_i$, as shown in FIG. 3(B). In some implementations, local points closer to the region center are deemed more important to the context. Specifically, for an interest point $p_j \in R_{p_i}$, its relative distance to $p_i$ is the Euclidean distance on the image plane normalized by the contextual region radius in accordance with Equation 1.

$$dist_{p_j \to p_i} = \frac{\|(x_{p_j}, y_{p_j}) - (x_{p_i}, y_{p_i})\|2}{r_c \times scale_{p_i}} \quad (1)$$

In addition, Equation 2 defines the contribution (supporting weight) of $p_j$ to $p_i$'s contextual distribution.

$$sw_{p_j \to p_i} = e^{-dist^2_{p_j \to p_i}/2} \quad (2)$$

The visual contextual distribution of $p_i$ is defined by a histogram of visual words in accordance with Equation 3.

$$C_{tf}(p_i) = [tf_1(p_i), \ldots, tf_m(p_i), \ldots, tf_M(p_i)] \quad (3)$$

In Equation 3, $tf_m$ is the term frequency of the visual word $\omega_m$ in the contextual region $R_{p_i}$. Although $C_{tf}$ can embed the co-occurrences among visual words, it is incapable of describing the spatial information, which has been proven to be important in many computer vision applications.

FIG. 3(C) adds histograms of visual words according to sectors.

Contextual definition component 122 obtains sector-based context by dividing the circular region $R_{p_i}$ into several equal sectors, as shown in FIG. 3(C). Each sector can be analyzed separately and the results concatenated or aggregated in various implementations. Contextual definition component 122 also rotates $R_{p_i}$ to align its dominant orientation for rotation invariance. Although a vertical orientation is illustrated at 308(2), any rotation matching the dominant orientation of $R_{p_i}$ is possible. As illustrated in 308(1), the sectors are numbered with 1, 2, . . . , K, for example clockwise starting from the sector on the right side of the dominant orientation.

In the visual context distribution $C_{tf}$, each $p_j$ is considered to contribute equally to the histogram. Then, Equation 4 represents the contextual distribution definition incorporating supporting weight.

$$C_{sw}(p_i) = [c_1(p_i), \ldots, c_m(p_i), \ldots, c_M(p_i)] \quad (4)$$

In Equation 4, $c_m(p_i)$ is defined in accordance with Equation 5.

$$c_m(p_i) = \Sigma_{p_j} sw_{p_j \to p_i} p_j \in R_{p_i} \ \& \ \omega_{p_j} = \omega_m \quad (5)$$

Contextual definition component 122 computes the contextual distribution for each sector as a sub-histogram as illustrated at 310(1), 310(2), 312(1), 312(2), 314(1), and 314(2), on 308(1) and 308(2), respectively. The contextual distribution for each sector is denoted as $C_{sw}^k$. All of these sub-histograms are concatenated to construct a new hyper-histogram $C_{sect}$ of length K×M to describe the contextual distribution of $R_{p_i}$ in accordance with Equation 6.

$$C_{sect}(p_i) = [C_{sw}^1(p_i), \ldots, C_{sw}^k(p_i), \ldots, C_{sw}^K(p_i)] \quad (6)$$

Contextual definition component 122 defines a contextual distribution of a visual word as the statistical aggregation of the contextual distributions of all its instances of $R_{p_i}$ in the database, as shown at 316, 318, and 320 in FIG. 3(D). For a visual word $\omega_m$, contextual definition component 122 averages $C_{sect}(p_i), \forall p_i \in \Pi_m$ to represent the statistical contextual distribution of the visual word in accordance with Equation 7.

$$C_m = [C_m^1, \ldots, C_m^k, \ldots, C_m^K] \quad (7)$$

In Equation 7, $c_m(p_i)$ is defined in accordance with Equation 8.

$$C_m^k = \frac{1}{|\mathbb{I}_m|} \sum_{p_i \in \mathbb{I}_m} C_{sw}^k(p_i) \qquad (8)$$

$C_m^k$ is an M-dimensional vector, and the $n^{th}$ element, $C_m^k(n)$, represents the weight of the visual word $\omega_n$ in the $k^{th}$ sector of $\omega_m$. In this way, $C_m$ incorporates abundant semantic information from instances in various images, and is more stable than the context of an individual image patch.

Figure 4:
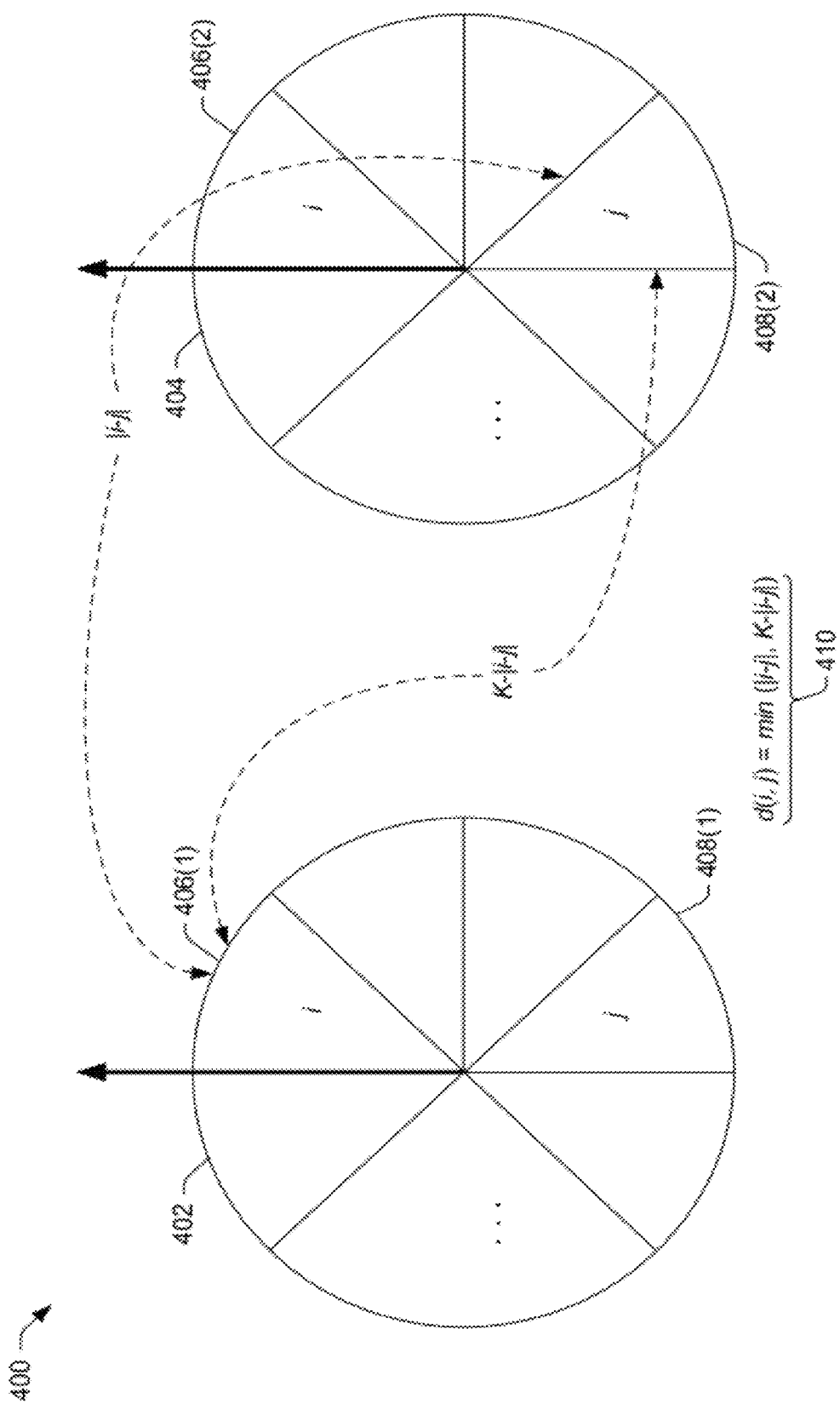
FIG. 4 illustrates an example of calculating circle distance between two sectors according to some implementations.

FIG. 4, at 400, illustrates an example schematic for calculating circle distance between two sectors according to some implementations. A first contextual region is designated 402, while 404 designates a second contextual region. Each contextual region 402 and 404 is divided into sectors and a circular distance is defined to measure similarity between any two sectors in the two contextual regions. In other words, one sector from contextual region 402 has the possibility to match another sector within contextual region 404. VCS application 118 defines a weight for the two sectors. VCS application 118 assigned a small weight if the two sectors are too far apart contextually. Meanwhile, VCS application 118 assigns a larger weight when two sectors are contextually close to highlight the similarities. Sectors 406(1) and 406(2) designate sector "i" on contextual regions 402 and 404 respectively. Meanwhile, sectors 408(1) and 408(2) designate sector "j" on contextual regions 402 and 404, respectively.

Similarity measurement component 124 measures the contextual similarity between two visual words to identify visual synonyms. First, the contextual distributions $\{C_m, 1 \leq m \leq M\}$ are normalized to provide a comparable measure between different visual words. Considering that $C_m$ is essentially a hyper-histogram consisting of K sub-histograms, in one implementation each sub-histogram $C_m^k$ is normalized, respectively. However, in practice the normalization of sub-histograms often results in the loss of spatial density information. In other words, a "rich" sector containing a large amount of visual word instances is treated equally to a "poor" sector. To keep the density information, in various implementations, Contextual definition component 122 performs an $l_2$-normalization on the whole histogram $C_m$ as if the circular region $R_{p_i}$ has not been partitioned into sectors.

Based on the $l_2$-normalized $C_m$, an example similarity measure is the cosine similarity. However, the cosine similarity on $C_m$ implies a constraint that different sectors (i.e., sub-histograms) are totally unrelated and will not be compared. This constraint is too restrictive for several implementations as sectors are only a very coarse partition of a contextual region. Moreover, the dominant direction estimation detector may be inaccurate. Therefore, the similarity of two visual words having close contextual distributions may be underestimated using cosine similarity. To tolerate the dislocation error, similarity measurement component 124 defines the contextual similarity of two visual words $\omega_m$ and $\omega_n$ in accordance with Equation 9.

$$\text{Sim}(\omega_m, \omega_n) = \sum_{k_m=1}^{K} \sum_{k_n=1}^{K} (\text{Sim}^{sec}(C_m^{k_m}, C_n^{k_n}) \cdot \Phi(k_m, k_n)) \qquad (9)$$

In Equation 9, $\text{Sim}^{sec}(C_m^{k_m}, C_n^{k_n})$ is the weighted inner product of the two sub-histograms $C_m^{k_m}$ and $C_n^{k_n}$ as set forth in Equation 10.

$$\text{Sim}^{sec}(C_m^{k_m}, C_n^{k_n}) = \sum_{v=1}^{M} idf_v^2 \cdot C_m^{k_m}(v) \cdot C_n^{k_n}(v) \qquad (10)$$

Meanwhile, the weight $idf_v$ is set to the inverse-document-frequency of the visual word $\omega_v$ in all the contextual distributions $\{C_m, 1 \leq m \leq M\}$, to punish those popular visual words. $\Phi$ is a pre-defined K×K matrix whose (i, f)-element approximates the dislocation probability between the $i^{th}$ and $j^{th}$ sectors. As shown in FIG. 4 at 410, $\Phi(i, j)$ is computed based on the exponential weighting of the circle distance between the corresponding sectors in accordance with Equation 11.

$$\Phi(i, j) = e^{-\frac{d(i,j)^2}{K/2}}, d(i, j) = \min(|i-j|, K-|i-j|) \qquad (11)$$

According to the similarity measure, the "contextual synonyms" of a visual word $\omega_m$ are defined as those visual words with the largest contextual similarities to $\omega_m$.

Figure 5:
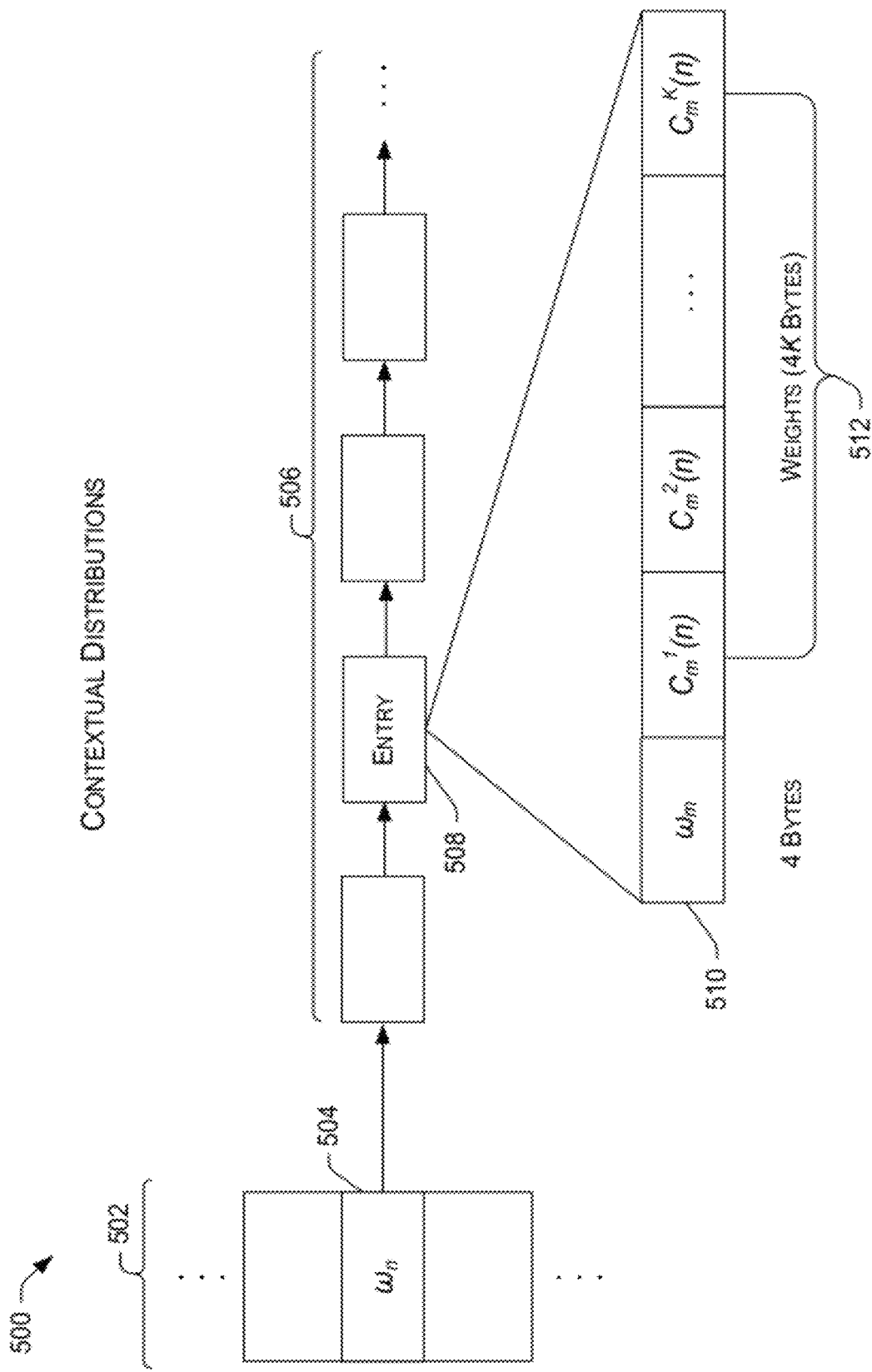
FIG. 5 illustrates an example of an inverted file data structure to index visual contextual synonyms according to some implementations.

FIG. 5 illustrates an example of an inverted file to index visual contextual synonyms according to some implementations.

In various implementations synonym dictionary component 126 constructs a contextual synonym dictionary in a data structure as illustrated in FIG. 5 from synonyms identified by similarity measurement component 124 for every visual word in the vocabulary. Also in some implementations VCS application 118 and/or web browser 116 leverages the synonym dictionary for use in various applications such as in large-scale visual search, visual object categorization, and visual object recognition.

Linear scan is a brute-force method to identify contextual synonyms for a visual word $\omega_q$ by scanning all of the visual words and comparing the contextual similarities one-by-one. However, the computational cost of linear scanning is extremely high when dealing with a large visual vocabulary. For example, to construct the synonym dictionary for a vocabulary with $10^5$ visual words, linear scan needs to compute $10^{10}$ similarities. Therefore, the linear scan solution may not be desirable for some implementations. To accelerate the construction process, synonym dictionary component 126 uses inverted files to index contextual distributions of visual words, as shown in FIG. 5. In some implementations, synonym dictionary component 126 builds inverted files 502 as follows. Every visual word $\omega_n$, illustrated by 504, has an entry list 506 in which each entry 508 represents another visual word $\omega_m$, illustrated at 510. Visual word $\omega_m$ has a contextual distribution containing $\omega_n$. An entry 508 records the identity of $\omega_m$ at 510, as well as the weights, $\{C_m^k(n), 1 \leq k \leq K\}$, illustrated at 512, of $\omega_n$ in the contextual distribution of $\omega_m$. Assuming $\|C_q\|$ unique non-zero elements in the contextual distribution of $\omega_q$, similarity measurement component 124 measures visual words in the corresponding $\|C_q\|$ entry lists to identify synonyms. $\|C_q\|$ is called the contextual distribution size of $\omega_q$, and $\|C_q\|_{avg}$ is the average of the contextual distribution sizes for all the visual words.

In several implementations, complexity analysis of VCS application 118 shows that each entry in the inverted files requests 4×(K+1) bytes, and the total memory cost is around 4×(K+1)×M×$\|C_q\|_{avg}$ bytes. The time cost to identify synonyms of one visual word is $O(\|C\|_{avg}^2 \times K)$, and the overall time complexity to construct the contextual synonym dictionary is $O(\|C\|_{avg}^2 \times K \times M)$. For example, in one implementation, given the vocabulary size M=500,000, the sector number K=16 and the contextual region scale $r_c$=4, the average contextual distribution size $\|C_q\|avg \approx 219$. The example construction process requires about 7G memory and runs around 35 minutes on a 16-core 2.67 GHz Intel Xeon® machine.

The average contextual distribution size $\|C_q\|_{avg}$ influences both memory and computation costs. To save the costs, in some implementations the contextual distribution can be made more sparse by removing visual words with small weights in the histogram, to satisfy $\|C_m\| \le \|C\|_{max}$, $\forall m \epsilon [1, M]$. Different settings of $\|C\|_{max}$ result in corresponding costs as discussed next.

In several implementations, VCS 118 performs contextual synonym-based expansion. The framework to leverage contextual synonyms in visual search extracts each visual word on the query image and expands each visual word to a list of $k_{nn}$ words of visual contextual synonyms. A weighted combination of the expansion words describes the query image. In some implementations, VCS application 118 only performs expansion on query images, although, in some instances VCS application 118 also expands images in the database, which greatly increases the index size and retrieval time. In addition, in some implementations, each local descriptor is only assigned to one visual word in quantization. The expanded synonym words are obtained via look up in the contextual synonym dictionary. Moreover, in synonym expansion, the weight of each synonym is in proportion to its contextual similarity to the related query word, whereas the combination weights in soft-quantization follow a Gaussian kernel.

Both soft-quantization and the synonym-based expansion employed in VCS application 118 need to determine the number of soft-assignment/expansion words, $k_{nn}$. By enumerating $k_{nn}$ from 1 to 10, it is clear that the performance of soft-quantization drops when more expansion words are included as the example shows in FIG. 2, neighbors in $l_2$ distance may represent noise in terms of semantic meaning. Accordingly, soft-quantization cannot help reduce semantic gaps in object retrieval. By contrast, the synonym expansion employed in VCS application 118 works well when the expansion number increases. The performance is relatively stable when $k_{nn}$ becomes large, and the additional expansion words do not hurt the search results. This stable performance indicates that the included contextual synonyms are semantically related to the query words.

As discussed regarding FIG. 3, contextual definition component 122 divides a contextual region into several sectors to embed more spatial information. Several example implementations evaluating different numbers of sectors are shown in Table. 1. Table 1 illustrates a performance comparison of partitioning the contextual region into different numbers of sectors K.

TABLE 1

| | K | | | | | |
|---|---|---|---|---|---|---|
| | 1 | 2 | 4 | 8 | 16 | 32 |
| mAP | 0.748 | 0.751 | 0.752 | 0.753 | 0.755 | 0.754 |

More sectors in the partition improved performance to a point. In various implementations discussed herein, K=16 is selected for the number of partitions.

VCS application 118 tempers the complexity to construct a contextual synonym dictionary by making the contextual distribution sparse with an upper bound threshold $\|c\|_{max}$. In various implementations, different $\|c\|_{max}$ values were tested and the corresponding mAP, memory cost, and running time are reported in Table 2, which shows complexity and performance analysis of different contextual distribution sizes according to some implementations.

TABLE 2

| $\|C\|_{max}$ | ∞ | 100 | 20 |
|---|---|---|---|
| $\|C\|_{avg}$ | 219.1 | 94.8 | 19.8 |

TABLE 2-continued

| mAP | 0.755 | 0.755 | 0.750 |
|---|---|---|---|
| Memory | 7.4 GB | 3.2 GB | 673 MB |
| Construction Time | 35 minutes | 19 minutes | 14 minutes |

Restricting the size of the contextual distribution impedes the characterization capability of contextual distribution. However, significantly reduced memory and run time due to the sparse operation also making the contextual distribution substantially noise-free offsets the slight drop in retrieval performance. In other words, words with small weights in the context are excludable as random noise.

FIGS. 6-9 are flow diagrams of example processes 600, 700, 800, and 900 respectively, for example processes for identifying visual contextual synonyms consistent with FIGS. 1-5.

In the flow diagrams of FIGS. 6-9, the processes are illustrated as collections of acts in a logical flow graph, which represents a sequence of operations that can be implemented in hardware, software, or a combination thereof. In the context of software, the blocks represent computer-executable instructions that, when executed by one or more processors, program a computing device 104 and/or 106 to perform the recited operations. Generally, computer-executable instructions include routines, programs, objects, components, data structures, and the like that perform particular functions or implement particular abstract data types. Note that order in which the blocks are described is not intended to be construed as a limitation, and any number of the described operations can be combined in any order and/or in parallel to implement the process, or an alternate process. Additionally, individual blocks may be deleted from the process without departing from the spirit and scope of the subject matter described herein. In various implementations, one or more acts of processes 600, 700, 800, and 900 may be replaced by acts from the other processes described herein. For discussion purposes, the processes 600, 700, 800, and 900 are described with reference to the architecture of FIG. 1, although other frameworks, devices, systems and environments may implement this process.

Figure 6:
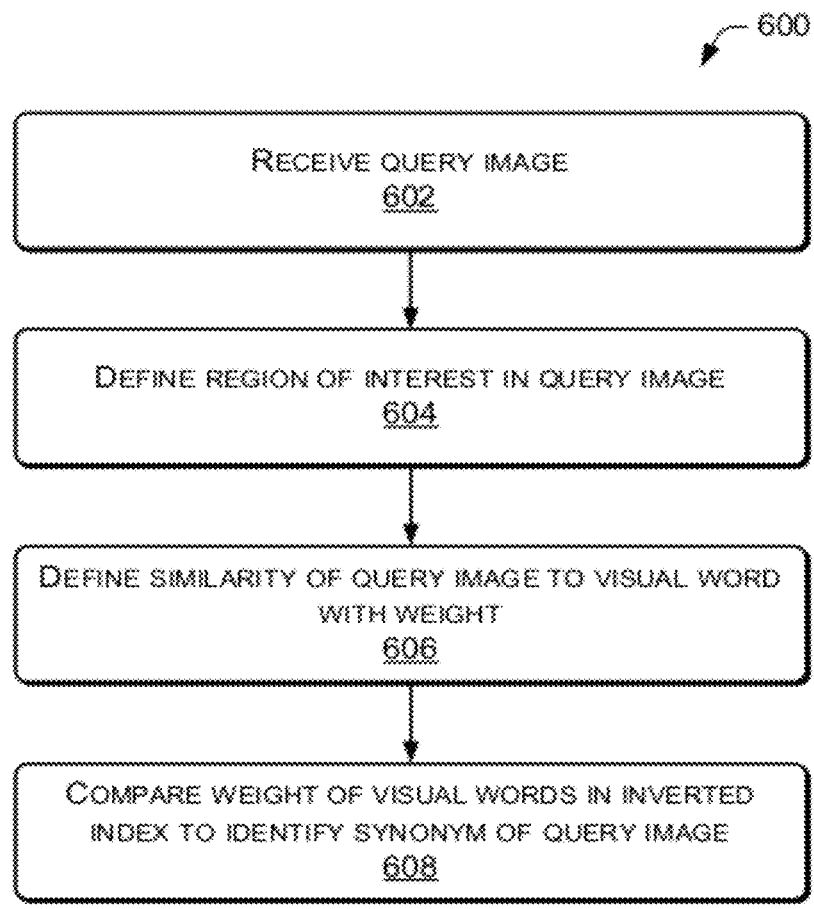
FIGS. 6-9 are flow diagrams of example processes for identifying and using visual contextual synonyms according to some implementations.

FIG. 6 presents process 600 of identifying visual contextual synonyms according to visual contextual synonym application 118, in some implementations for example. At 602, visual contextual synonym application 118 receives or otherwise obtains a query image such as image 202 at computing device 104 or 106 for use in an application such as a visual search application or other computer vision application as discussed above.

At 604, contextual definition component 122 defines a visual contextual region, such as region 304 centered on an interest point in the query image as discussed above regarding FIG. 3.

At 606, similarity measurement component 124 measures the contextual similarity between two visual words to identify visual synonyms as discussed above regarding FIG. 4.

At 608, synonym dictionary component 126 compares the weight of visual words in an inverted index as discussed above regarding FIG. 5 to identify synonyms to the query image.

Figure 7:
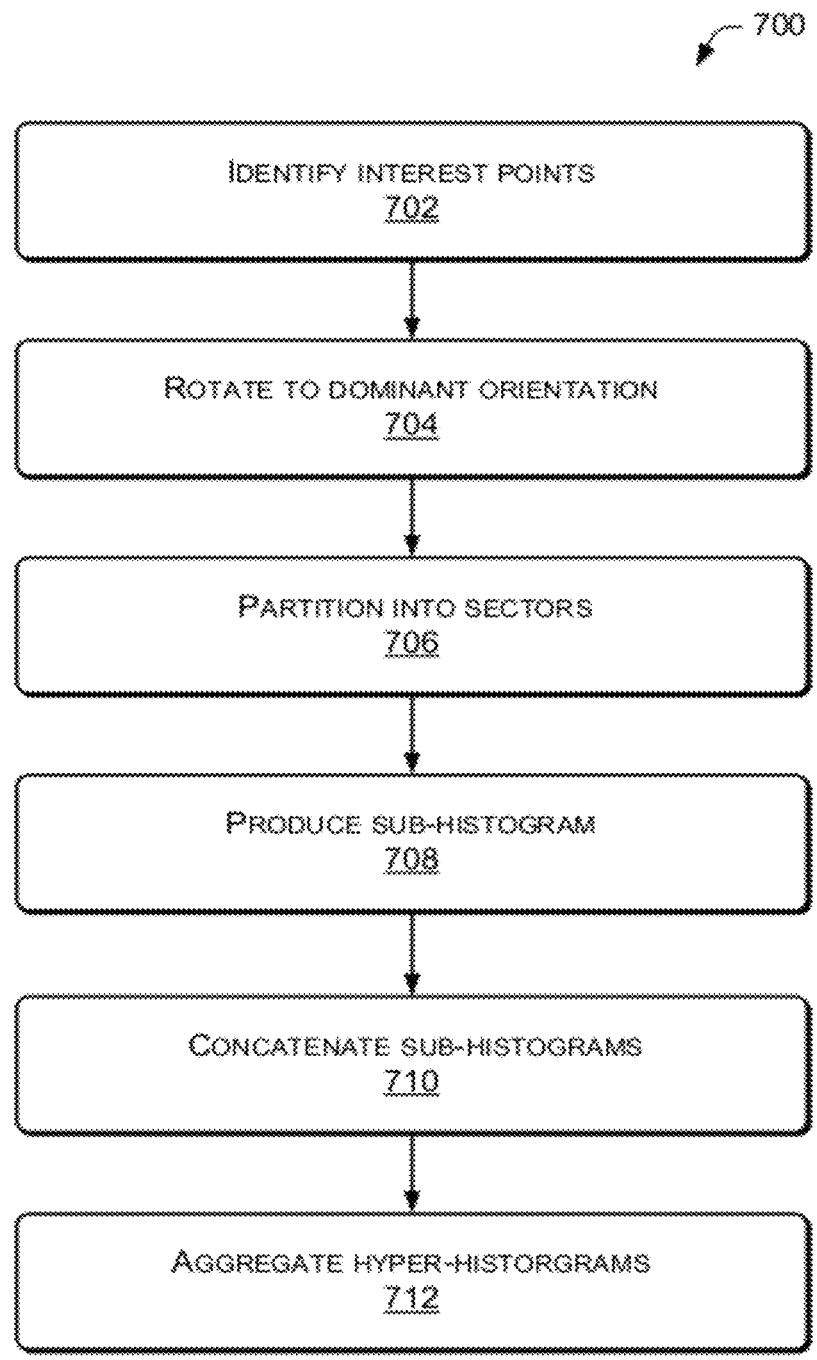

FIG. 7 presents process 700 of identifying visual contextual synonyms according to visual contextual synonym application 118, in some implementations for example. At 702, a local interest point detector identifies interest points in a visual contextual region, such as region 304 as discussed above regarding FIG. 3.

At 704, as discussed above regarding 308, contextual definition component 122 rotates the visual contextual region to a predetermined dominant orientation. In some instances, the dominant orientation is determined based on comparison of one or more interest points in a visual contextual region of a query image compared to the instant visual contextual region.

At 706, contextual definition component 122 partitions the visual contextual region into sectors.

At 708, contextual definition component 122 produces a sub-histogram representing the interest points in each sector.

At 710, contextual definition component 122 concatenates the sub-histograms of each sector to construct a new hyper-histogram to describe the contextual distribution of the visual contextual region.

At 712, contextual definition component 122 averages the hyper-histograms across all instances of the visual contextual region in the database to represent the statistical contextual distribution of the visual word. The contextual distribution of a visual word is the statistical aggregation of the contextual distributions of all its instances of the visual contextual region in the database according to some implementations.

Figure 8:
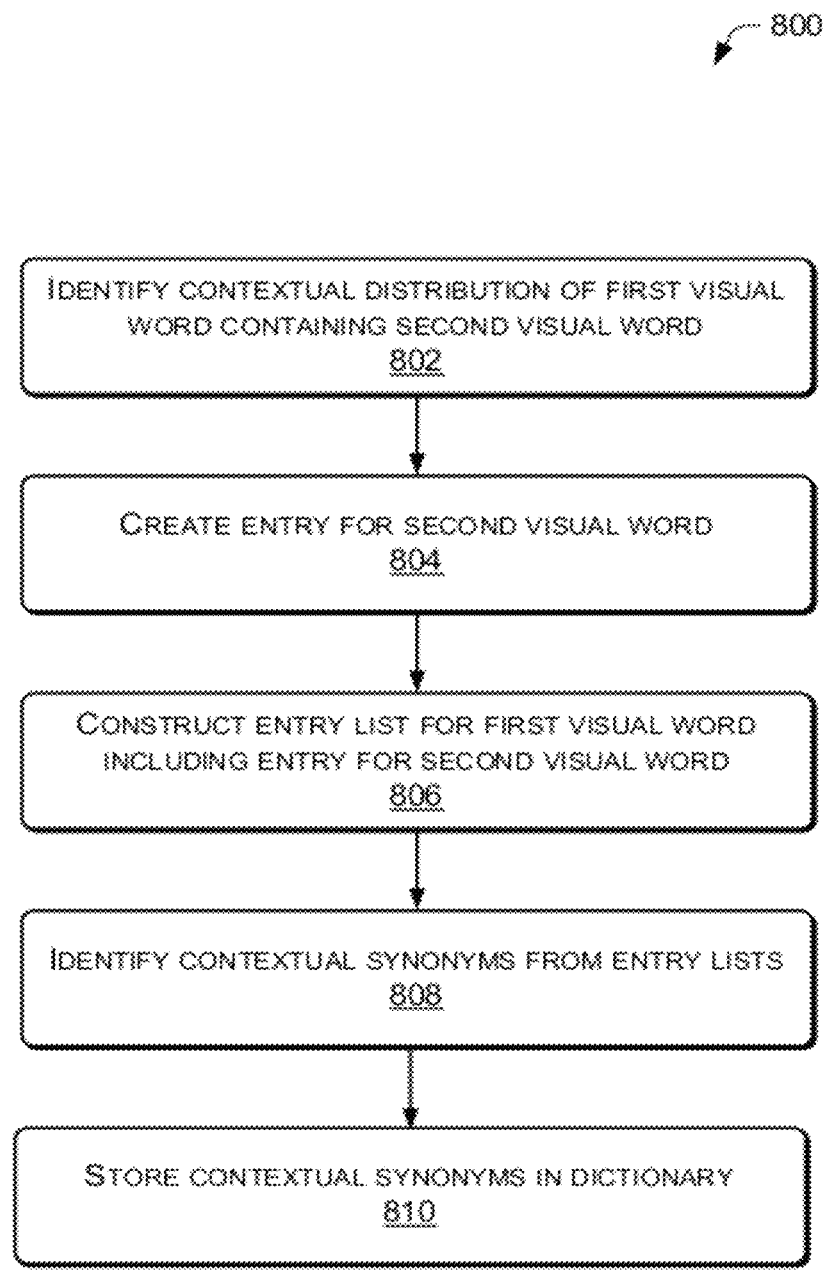

FIG. 8 presents process 800 of identifying visual contextual synonyms according to visual contextual synonym application 118, in some implementations for example. At 802, synonym dictionary component 126 identifies a first visual word having a contextual distribution containing a second visual word.

At 804, synonym dictionary component 126 creates an entry, such as entry 508, for the second visual word. The entry records information including the identity of the second visual word, and the weights of the first visual word in the contextual distribution of the second visual word in a data structure such as that illustrated in FIG. 5.

At 806, synonym dictionary component 126 constructs an entry list for the first visual word such as list 506. The entry list constructed includes the entry for the second visual word.

At 808, synonym dictionary component 126, or in some instances, similarity measurement component 124, measures visual words in a plurality of entry lists to identify contextual synonyms.

At 810, synonym dictionary component 126 stores the contextual synonyms in a contextual synonym dictionary such as visual dictionary 128 in some implementations.

Figure 9:
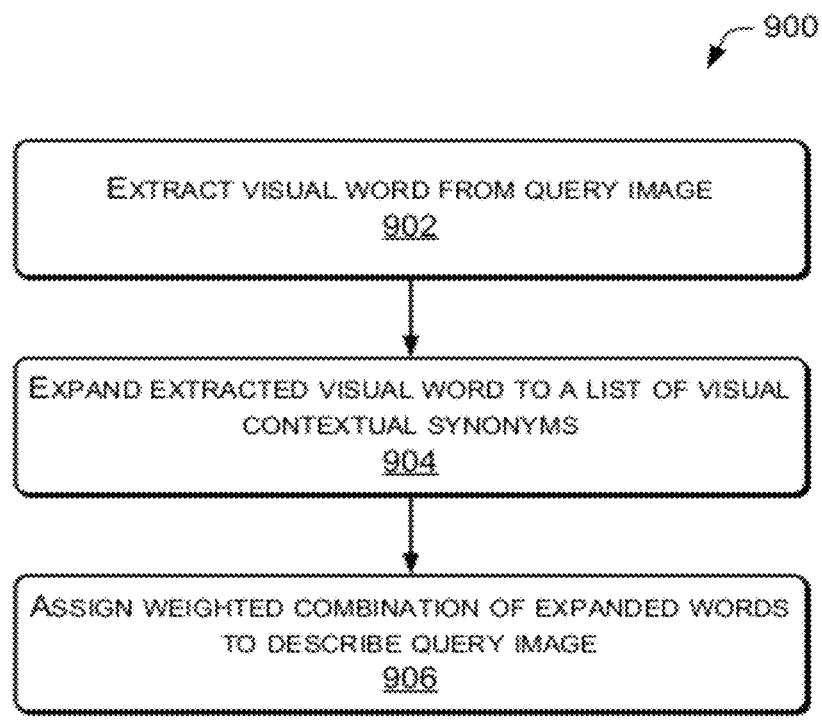

FIG. 9 presents process 900 of identifying visual contextual synonyms according to visual contextual synonym application 118, in some implementations for example.

At 902, VCS application 118 extracts each visual word in a query image.

At 904, VCS application 118 expands each visual word extracted from the query image to a list of words of visual contextual synonyms.

At 906, VCS application 118 assigns a weighted combination of the expansion words to describe the query image.

Conclusion

The above architecture and process employing visual contextual synonyms may be implemented in a number of different environments and situations. While several examples are described herein for explanation purposes, the disclosure is not limited to the specific examples, and can be extended to additional devices, environments, and applications.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

We claim:

1. A method comprising:
   receiving an image;
   defining a region of visual context in the image;
   partitioning the region of visual context into sectors;
   producing a sub-histogram for each sector, wherein the sub-histograms represent which of the sectors contain which of one or more local interest points in the region of visual context;
   concatenating the sub-histograms produced for each sector to generate a histogram describing a contextual distribution of the region of visual context; and
   storing the histogram describing the contextual distribution of the region of visual context.

2. A method as recited in claim 1, further comprising:
   extracting a visual word from the image;
   expanding the visual word to a plurality of visual contextual synonyms; and
   producing a panel of patches representing a weighted combination of the plurality of visual contextual synonyms.

3. A method as recited in claim 2, further comprising providing the panel of patches to a search application.

4. A method as recited in claim 1, further comprising calculating a circle distance between the sectors in a defined region of interest of the image.

5. A method as recited in claim 1, further comprising aggregating hyper-histograms across multiple instances of a defined region of interest of the image to represent the contextual distribution of a visual word extracted with the image.

6. A method as recited in claim 1, further comprising averaging hyper-histograms across multiple instances of a defined region of interest of the image to represent the contextual distribution of a visual word extracted from the image.

7. A method as recited in claim 1, further comprising:
   extracting a visual word from the image based on a defined region of interest of the image; and
   expanding the visual word extracted to visual contextual synonyms, wherein the visual contextual synonyms include visual words identified from a visual vocabulary based on having contextual distributions similar to a contextual distribution of the visual word.

8. A method as recited in claim 7, further comprising assigning a weight to the visual word.

9. A method as recited in claim 8, further comprising describing the image with a weighted combination of the visual contextual synonyms.

10. A method as recited in claim 9, the method further comprising:
identifying the contextual distribution of the visual word, the contextual distribution containing an additional visual word; and
creating an inverted list entry from which to build an inverted list, the creating including recording in the inverted list entry information for the additional visual word including an identity of the additional visual word and a weight of the visual word in a contextual distribution of the additional visual word.

11. A method as recited in claim 10, further comprising identifying a visual contextual synonym of the visual word from the inverted list.

12. A computer-readable storage medium having computer-executable instructions recorded thereon, the computer-executable instructions to configure a computer to perform operations comprising:
obtaining an image;
defining a region of visual context in the image;
identifying one or more local interest points in the region of visual context;
partitioning the region of visual context into sectors;
producing a sub-histogram for each sector, wherein the sub-histograms represent which of the sectors contain which of the one or more local interest points;
concatenating the sub-histograms produced for each sector to generate a histogram describing a contextual distribution of the region of visual context; and
storing the histogram describing the contextual distribution of the region of visual context.

13. A computer-readable storage medium as recited in claim 12, the operations further comprising performing a visual contextual search using the region of visual context.

14. A computer-readable storage medium as recited in claim 12, the operations further comprising calculating a circle distance between the sectors in the region of visual context.

15. A computer-readable storage medium as recited in claim 12, the operations further comprising aggregating the histogram describing the contextual distribution of the region of visual context with other histograms representing the region of visual context.

16. A computer-readable storage medium as recited in claim 12, the operations further comprising rotating the region of visual context to a dominant orientation associated with another region of visual context of another image.

17. A computer-readable storage medium as recited in claim 12, the operations further comprising producing a panel of images including a weighted combination of visual contextual synonyms for the region of visual context.

18. A system comprising:
a processor;
a memory coupled to the processor, the memory storing components for identifying visual contextual synonyms, the components configured to perform operations comprising:
obtaining an image;
defining a region of visual context in the image;
identifying one or more local interest points in the region of visual context;
partitioning the region of visual context into sectors;
producing a sub-histogram for each sector, wherein the sub-histograms represent which of the sectors contain which of the one or more local interest points; and
concatenating the sub-histograms produced for each sector to generate a histogram describing a contextual distribution of the region of visual context.

19. A system as recited in claim 18, wherein the operations further comprise storing the histogram describing the contextual distribution of the region of visual context.

20. A system as recited in claim 18, wherein the operations further comprise producing a panel of images including a weighted combination of visual contextual synonyms for the region of visual context.

* * * * *